United States Patent
Monteiro et al.

(10) Patent No.: US 8,033,118 B2
(45) Date of Patent: Oct. 11, 2011

(54) BLEED AIRFLOW BALANCING CONTROL USING SIMPLIFIED SENSING

(75) Inventors: Oswaldo Barthel Monteiro, Sao Jose dos Campos (BR); Vinicius Jorge Tin, Sao Jose dos Campos (BR); Bernardo Campos da Silva Franco, Sao Jose dos Campos (BR); Ricardo Jose Barbosa, Sao Jose Dos Campos (BR)

(73) Assignee: EMBRAER—Empresa Brasileira de Aeronautica S.A., Sao Jose dos Campos-SP (BR)

( * ) Notice: Subject to any disclaimer, the term of this patent is extended or adjusted under 35 U.S.C. 154(b) by 875 days.

(21) Appl. No.: 12/023,585

(22) Filed: Jan. 31, 2008

(65) Prior Publication Data

US 2009/0193811 A1    Aug. 6, 2009

(51) Int. Cl.
*F02C 9/00* (2006.01)
*F02C 6/08* (2006.01)
(52) U.S. Cl. ................. 60/782; 60/785; 60/795
(58) Field of Classification Search .......... 60/224, 60/782, 785, 795; 244/55
See application file for complete search history.

(56) References Cited

U.S. PATENT DOCUMENTS

| | | | |
|---|---|---|---|
| 4,671,318 A | 6/1987 | Benson | |
| 4,735,056 A | 4/1988 | Goodman | |
| 4,765,131 A | 8/1988 | Benson | |
| 5,137,230 A | 8/1992 | Coffinberry | |
| 5,155,991 A * | 10/1992 | Bruun | 60/785 |
| 6,494,047 B2 * | 12/2002 | Yeung | 60/782 |
| 6,782,701 B2 | 8/2004 | Liu et al. | |
| 7,536,865 B2 * | 5/2009 | Mikhail | 60/795 |
| 2007/0256558 A1 | 11/2007 | Schwalm | |

FOREIGN PATENT DOCUMENTS

| WO | 02/46040 A1 | 6/2002 |
|---|---|---|
| WO | 2006104535 A1 | 10/2006 |

\* cited by examiner

*Primary Examiner* — Ehud Gartenberg
*Assistant Examiner* — Arun Goyal
(74) *Attorney, Agent, or Firm* — Nixon & Vanderhye PC

(57) ABSTRACT

A simplified air bleed balancing control system for a pair of aircraft gas turbine engines reduces the number of pressure transducers and differential pressure transducers. Advantages include lower weight, less expensive system, better total system MTBF (mean time before failure), acceptable differential pressure transducer drift identification and compensation by the digital controller, and fewer maintenance tasks.

8 Claims, 5 Drawing Sheets

EXEMPLARY ILLUSTRATIVE IMPROVED BLEED MASS FLOW BALANCING CONTROL

EXEMPLARY ILLUSTRATIVE AIRCRAFT GAS TURBINE ENGINE

DUAL BLEED AIRFLOW BALANCING CONTROL

EXEMPLARY ILLUSTRATIVE IMPROVED BLEED MASS FLOW BALANCING CONTROL

EXEMPLARY ILLUSTRATIVE PRESSURE REGULATING SHUTOFF VALVE CONTROL LAW

EXEMPLARY ILLUSTRATIVE
PRESSURE REGULATING
SHUTOFF VALVE CONTROL LAW
FOR "VENTURILESS" CONFIGURATION

BLEED AIRFLOW BALANCING CONTROL USING SIMPLIFIED SENSING

CROSS-REFERENCES TO RELATED APPLICATIONS

Not applicable.

STATEMENT REGARDING FEDERALLY SPONSORED RESEARCH OR DEVELOPMENT

Not applicable.

TECHNICAL FIELD

The technology herein relates to aircraft engine airflow control, and more particularly to bleed airflow balancing control using simplified pressure sensing. Still more particularly, an exemplary illustrative non-limiting implementation provides bleed airflow balancing using a single bi-directional differential pressure transducer and a single pressure transducer.

BACKGROUND AND SUMMARY

As shown in FIG. 1, gas turbine engines 10 of the type commonly found on many aircraft include a compressor 20, a combuster 30 and a turbine 40. The compressor 20 compresses air which is then mixed with fuel for combustor 30 to ignite. The combustor 30 exhausts gases turn the vanes of the turbine(s) 40. Power from the rotating turbine 40 operates the compressor 20.

Turbine engine compressors 20 can be designed to supply more compressed air than is needed to operate the engine 10. This additional compressed air from the compressor 20 can be used for tasks other than feeding the combustor 30. For example, it is common to bleed some of the compressed air from the compressor 30 and route it to other equipment onboard the aircraft such as de-icers, cabin pressurization systems and the like.

Each of the aircraft engines 10 can be used as a source for compressed bleed air. It is generally desirable to balance the amount of bleed air obtained from each pair of engines 10 to equalize wear and other engine operating conditions. Various techniques have been designed in the past to control such bleed air balancing.

An exemplary prior art airflow balancing control 100 for a dual engine, dual bleed aircraft is shown in FIG. 2. In this prior art exemplary design, hot bleed air flow from the compressor 30 of a first engine 10a is regulated by a first pressure regulating shutoff valve 110a, and hot bleed air flow from the compressor 20 of a second engine 10b is regulated by a second pressure regulating shutoff valve 110b. These two streams of regulated hot bleed air are provided to precoolers 112a, 112b that receive cold air from the fan or prop (in the case of a turboprop) on the front of the engines 10a, 10b. The amount of cold air is also regulated by valves 114a, 114b. The outputs of precoolers 112a, 112b are provided to opposite input ports 116a, 116b of a T-configuration bleed air manifold 118. Upon entering the input ports 116a, 116b, the bleed air flow encounters temperature sensors 108a, 108b respectively that measure the bleed air temperature. The two different bleed air streams are then passed through respective venturis 120a, 120b before being combined into a common air supply to aircraft systems available at a manifold output port 122. Differential pressure transducers 104a, 104b placed across each venturi 120a, 120b measures the bleed air flow pressure differential across the venturi's throat. Pressure transducers 106a, 106b placed within the manifold 116 before the bleed air flow encounters the venturis 120 measures the absolute pressure of each engine's bleed air flow.

It can be observed that digital controller 102 receives the signals provided by the two differential pressure transducers 104a, 104b, the two pressure transducers 106a, 106b and the two temperature sensors 108a, 108b. Digital controller 102 processes these signals to determine the mass air flow of each bleed air stream. Control law software operating on the controller 102 calculates currents that are delivered to modulate the PRSOV 1 (Pressure Regulating Shutoff Valve) 110a and PRSOV 2 (Pressure Regulating Shutoff Valve) 110b butterflies that independently control how much air to bleed from the compressors 20 of each of engines 10a, 10b, respectively. In this way, the controller 102 can dynamically balance the mass air flow from the respective bleed air streams to ensure that each engine 10a, 10b contributes exactly half of the total bleed air pressure provided at manifold output port 122.

Generally speaking, the exemplary illustrative non-limiting controller 102 may implement a control law algorithmic process that processes these currents as follows. The pressure delivered to the aircraft systems should stabilize in the desired set point in acceptable settling time; the respective pressure overshoot and undershoot should also be acceptable and under steady state condition; each engine should contribute half of the total air bleed flow.

While much work has been done in the past, further improvements are possible and desirable. In particular, it would be highly advantageous to simplify the air bleed balancing control system described above to reduce the number of pressure transducers, to reduce system weight and to optimize the bleed balancing control system.

An exemplary illustrative non-limiting method of controlling bleed air flow may comprise measuring the differential pressure between a first bleed air flow and a second bleed air flow; generating a differential pressure correction signal in response to said measured differential pressure; measuring the pressure of a bleed air flow obtained by combining said first and second bleed air flows; and controlling valves modulating said first and second bleed air flows based at least in part on said measured pressure and said differential pressure correction signal.

The method may further include measuring the temperature of said first bleed air flow and measuring the temperature of said second bleed air flow, and said controlling includes modulating said first and second bleed air flows in response to said measured temperatures. The differential pressure measuring may comprise measuring the differential pressure between the throat of a first venturi through which said first bleed air flow passes, and the throat of a second venturi through which said second bleed air flow passed. The differential pressure measuring may comprise measuring the differential pressure between two different regions of a manifold used to combine said first and second bleed air flows. The method may further include deriving said first bleed air flow from a first gas turbine engine, and deriving said second bleed air flow from a second gas turbine engine. The generating may includes applying a proportional gain, an integration and a differentiation. The controlling may comprise controlling first and second pressure regulating shutoff valves.

A dual engine bleed airflow regulator may comprise a single pressure transducer that measures the pressure of combined first bleed air flow from a first engine and a second bleed air flow from a second engine; a single bi-directional differential pressure transducer that measures the difference between the pressure of said first bleed air flow and said second bleed air flow; and a controller responsive to said single differential pressure transducer and said single pressure transducer, said controller generating a first control signal for modulating said first bleed air flow and generating a second control signal for modulating said second bleed air flow.

Non-limiting exemplary illustrative features and advantages include:
Reduced number of pressure transducers.
Reduced number of differential pressure transducers.
Lower weight.
Less expensive system.
Acceptable differential pressure transducer drift identification and compensation by the digital controller during the system power-up (when there is zero pressure)
Better total system MTBF (mean time before failure) and, consequently, it requires less maintenance tasks.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Figure 1:
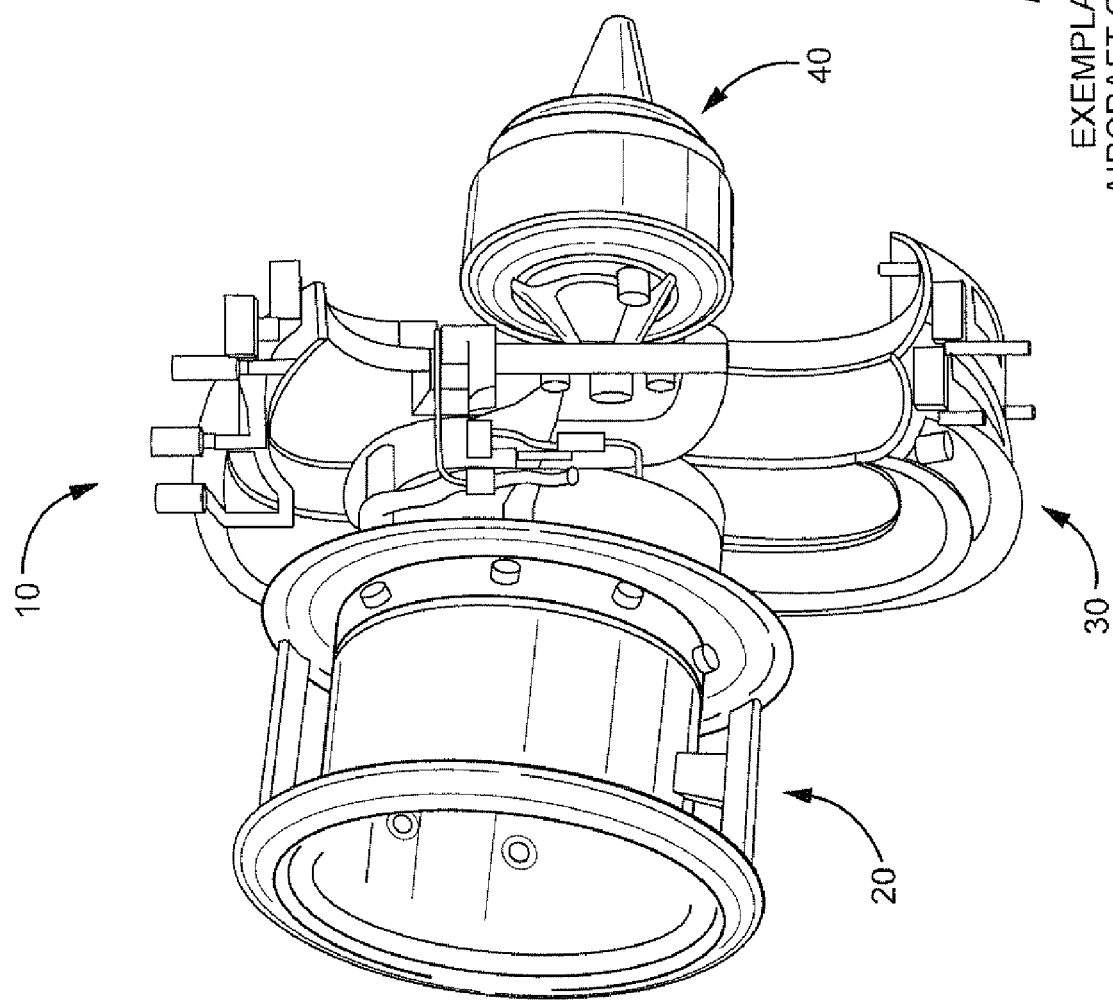
FIG. 1 shows an exemplary illustrative non-limiting aircraft gas turbine engine.
Figure 2:
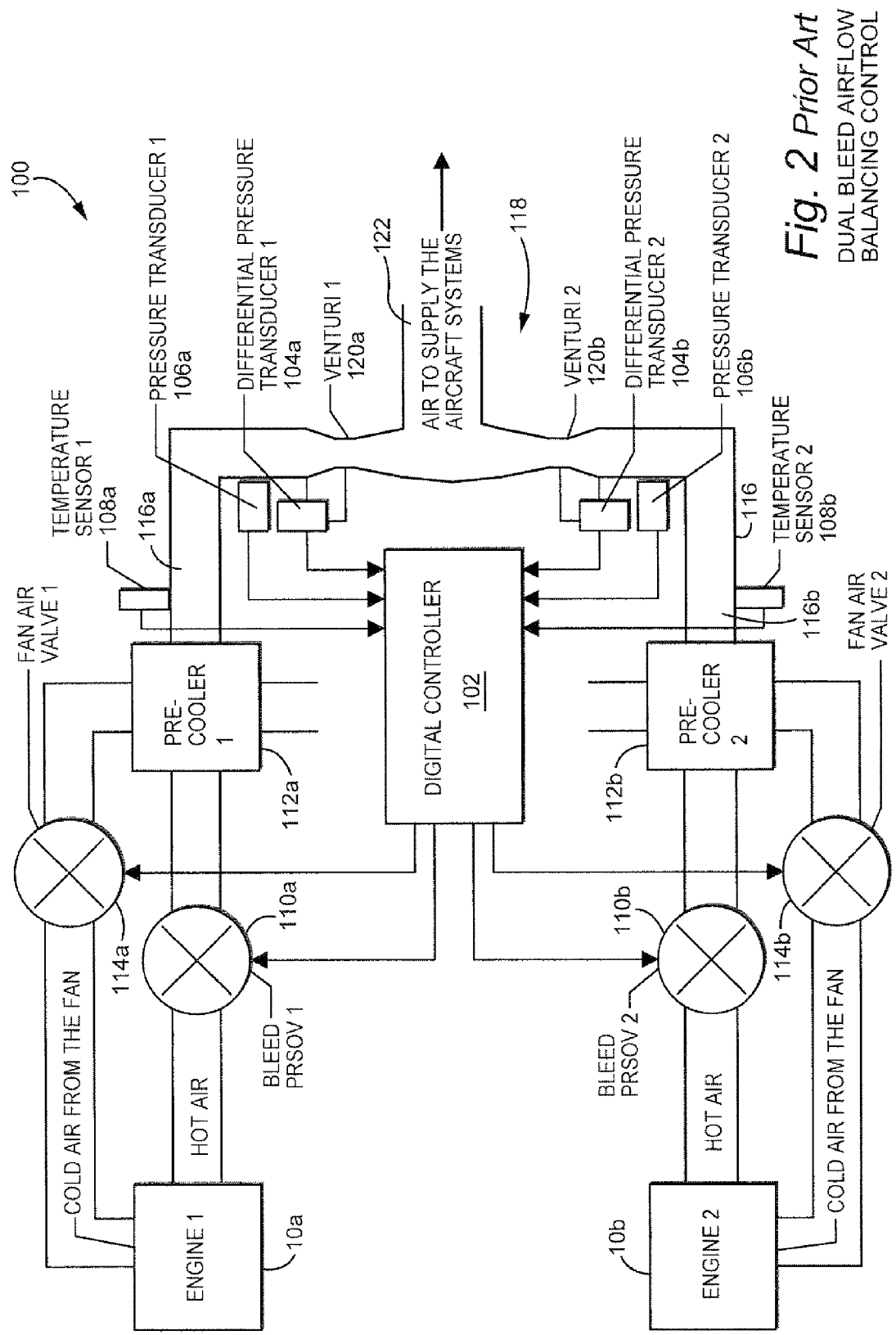
FIG. 2 is a block diagram of an exemplary illustrative non-limiting prior art dual bleed airflow balancing control.
Figure 3:
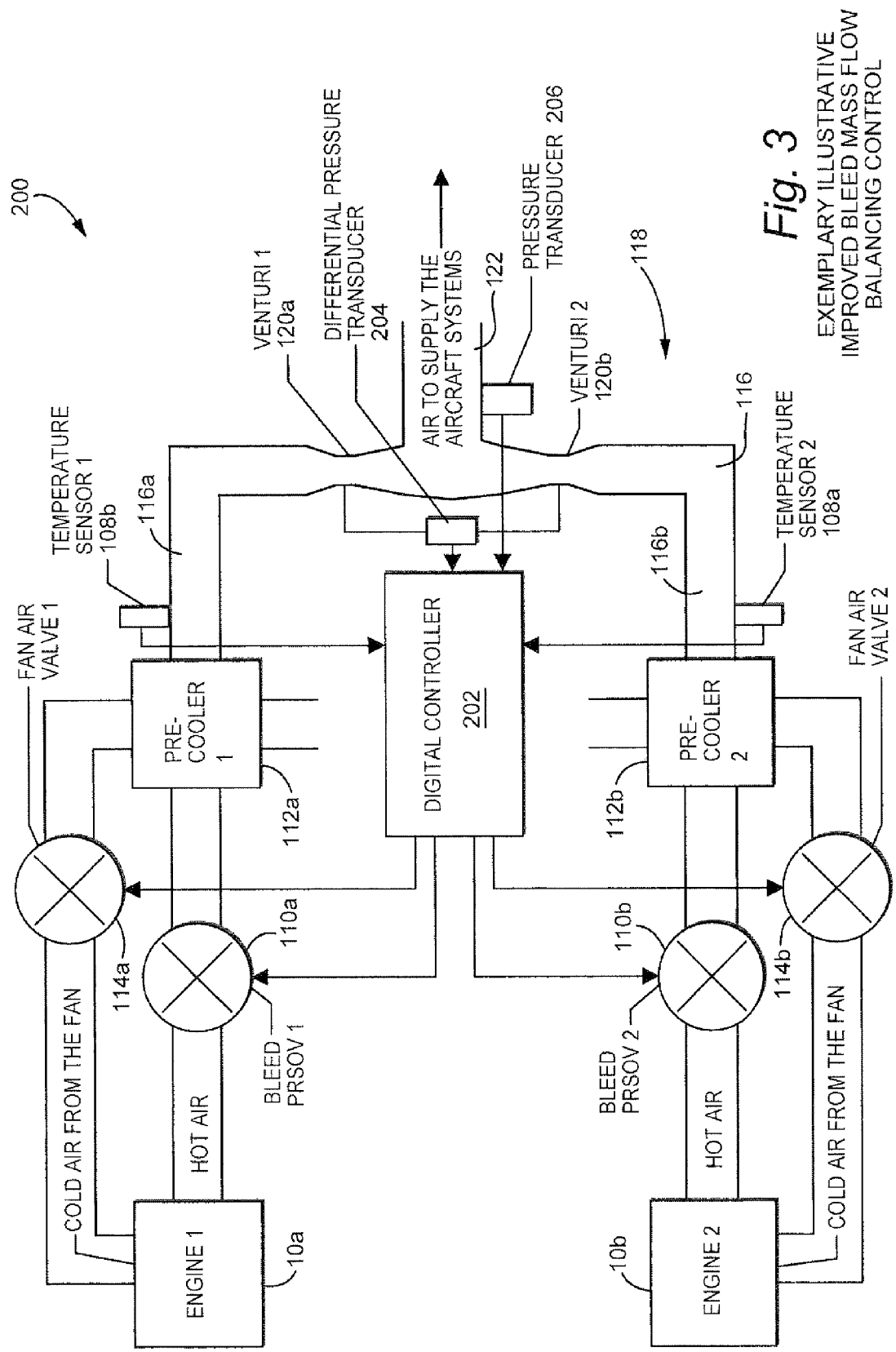
FIG. 3 is an exemplary illustrative non-limiting improved bleed mass flow balancing control employing a reduced number of sensors.

In the FIG. 3 exemplary illustrative non-limiting implementation for a pair of engines 10a, 10b, a digital controller 202 processes the information provided by a single differential bi-directional pressure transducer 204, a single pressure transducer 206 and two temperature sensors 108a, 108b. In this exemplary illustrative non-limiting implementation, temperature sensor 108a senses the temperature of the bleed air stream from engine 10a, and temperature sensor 108b senses the temperature of the bleed air stream from engine 10b as discussed in connection with FIG. 2. However, in this exemplary illustrative non-limiting implementation, the differential pressure transducer 204 is no longer connected or disposed to monitor the pressure drop across either one of venturis 120a, 120b. Instead, the bi-directional differential pressure transducer 204 measures the difference between (a) the pressure after engine 10a's bleed air stream passes through the throat of venturi 120a, and (b) the pressure after engine 10b's bleed air stream passes through the throat of venture 120b. Furthermore, pressure transducers 106a, 106b shown in FIG. 2 can be eliminated, and a single pressure transducer 206 is now placed in the manifold output port 122 to sense the pressure of the combined bleed air flow from the pair of engines 10a and 10b.

In the exemplary illustrative non-limiting implementation, venturis 120a, 120b are preferably configured identically, so it is assumed that the pressure difference caused by passage through each venture 120a, 120b is almost or substantially the same. In other words, after the both venturis 120a, 120b, it is assumed that the "T" duct output port 122 has symmetrical dimensions with respect to each of engine 10a, 10b bleed air flows. It is also assumed that both Fan Air Valve 114a, 114b control loops are adjusted to the same temperature set point. Therefore, after a transient period is over and the system reaches steady state, both side temperatures can be considered almost the same.

Figure 4:
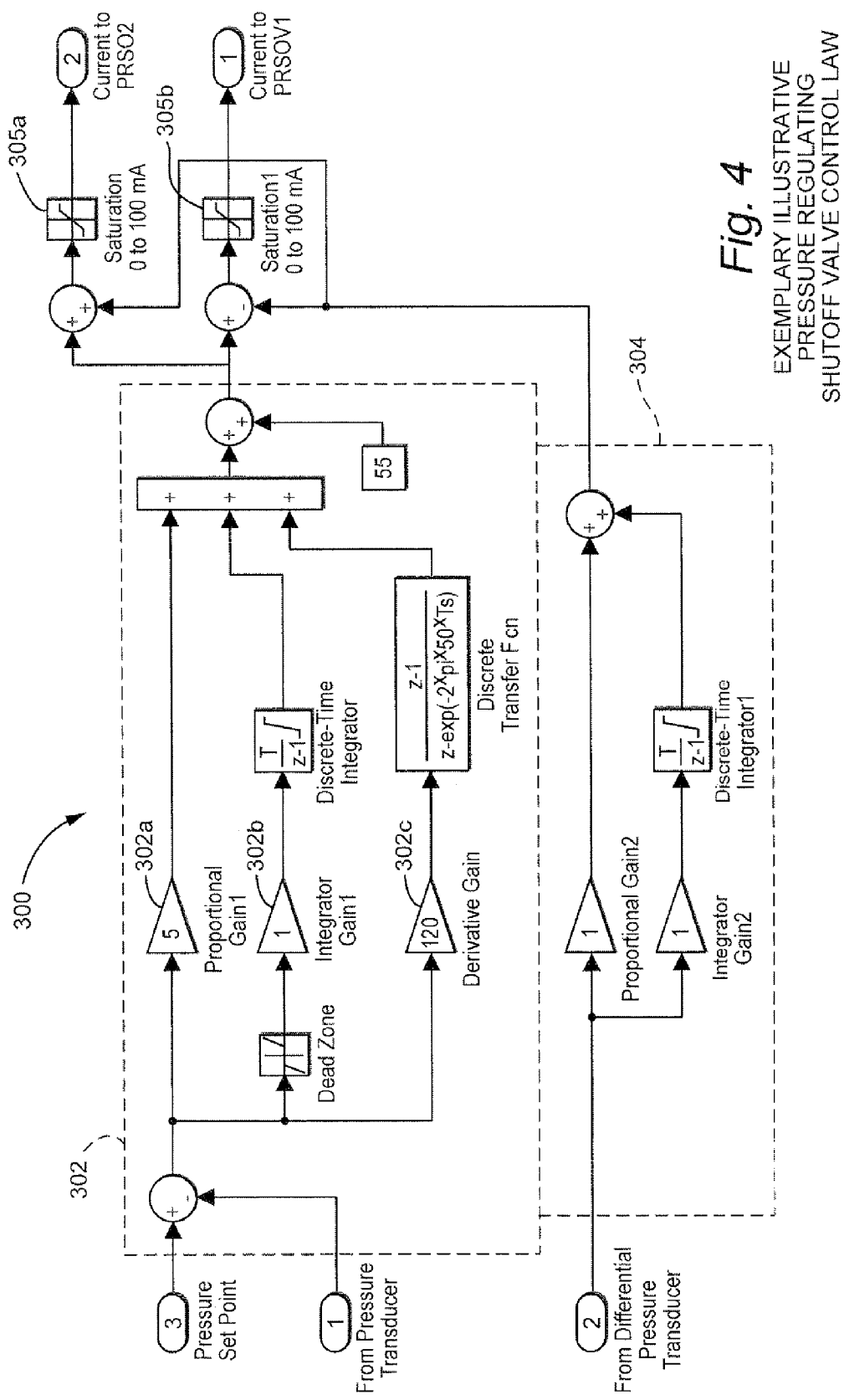
FIG. 4 shows an exemplary illustrative non-limiting pressure regulating shutoff valve control law control law architecture that may be implemented inside a digital controller.

An exemplary illustrative non-limiting pressure shutoff valve control law architecture or algorithm 300 that is implemented by digital controller 202 is shown in the FIG. 4. This exemplary illustrative non-limiting control law architecture 300 (implemented by software running on controller 202 in the illustrative non-limiting exemplary implementation) can be divided into two control loops 302, 304.

One control loop 302 is the pressure transducer loop. Pressure control loop 302 calculates the average current to modulate the both PRSOV valve butterflies 110a, 110b in order to reach the desired pressure set point in an acceptable settling time, considering also acceptable pressure overshoots and undershoots. In more detail, the pressure sense output signal of pressure transducer 206 is combined with a pressure set point and is then applied to three different subchannels. The first subchannel 302a provides a proportional gain. The second subchannel 302b provides a dead zone (hysteresis) based integration gain and discrete time integration. The third subchannel 302c provides a discrete gain that is differentiated using a discrete transfer function. These three processed subchannel outputs are available for combining according to a predetermined function.

The second control loop 304 is the differential pressure transducer loop. This differential pressure control loop 304 is used to annul or correct for the differential pressure between the left and right sides. Its set point is assumed to be 0 PSID in the exemplary illustrative non-limiting implementation, so no set point value combine is needed. After an acceptable transient period, the pressure in each venturi throat 120a, 120b converges to the same value. At this moment, it can be considered that bleed airflow from both engines 10a, 10b are symmetrically balanced. The exemplary illustrative non-limiting implementation provides this processing using a proportional gain and an integrator gain that is integrated using a discrete time integration.

In the exemplary illustrative non-limiting implementation, the outputs of control loops 302, 304 are combined and then applied to control each of valves 110a, 110b. Clippers 305a, 305b may be used to prevent valves 110a, 110b from being overdriven.

Considering that an acceptable transducer drift may be identified and effectively compensated by the digital controller 202 during the system power-up (when there is zero pressure) and also considering that the differential pressure transducer loop 304 tries continuously to annul the differential pressure between the both venturis, 120a, 120b, by providing a correction signal to the pressure control loop 302 output, this differential pressure control loop 304 is immune to transducer gain degradation. In other words, the proposed configuration remains robust even as the system ages and the characteristics of differential pressure transducer 104b changes. The change in characteristics of differential pressure transducer 104b affects the bleed air flow of both engines 104a, 104b equally. The differential pressure transducer provides a "zero" adjustment in every A/C power up to compensate for any bias in the transducer, thus providing independence from drift.

The risk of unstable interactions between the different PRSOVs 110*a*, 110*b* (which are designed to have identical characteristics but may not in fact have identical characteristics) is reduced because the pressure transducer loop 302 provides simultaneously the same average current for both valves.

Figure 5:
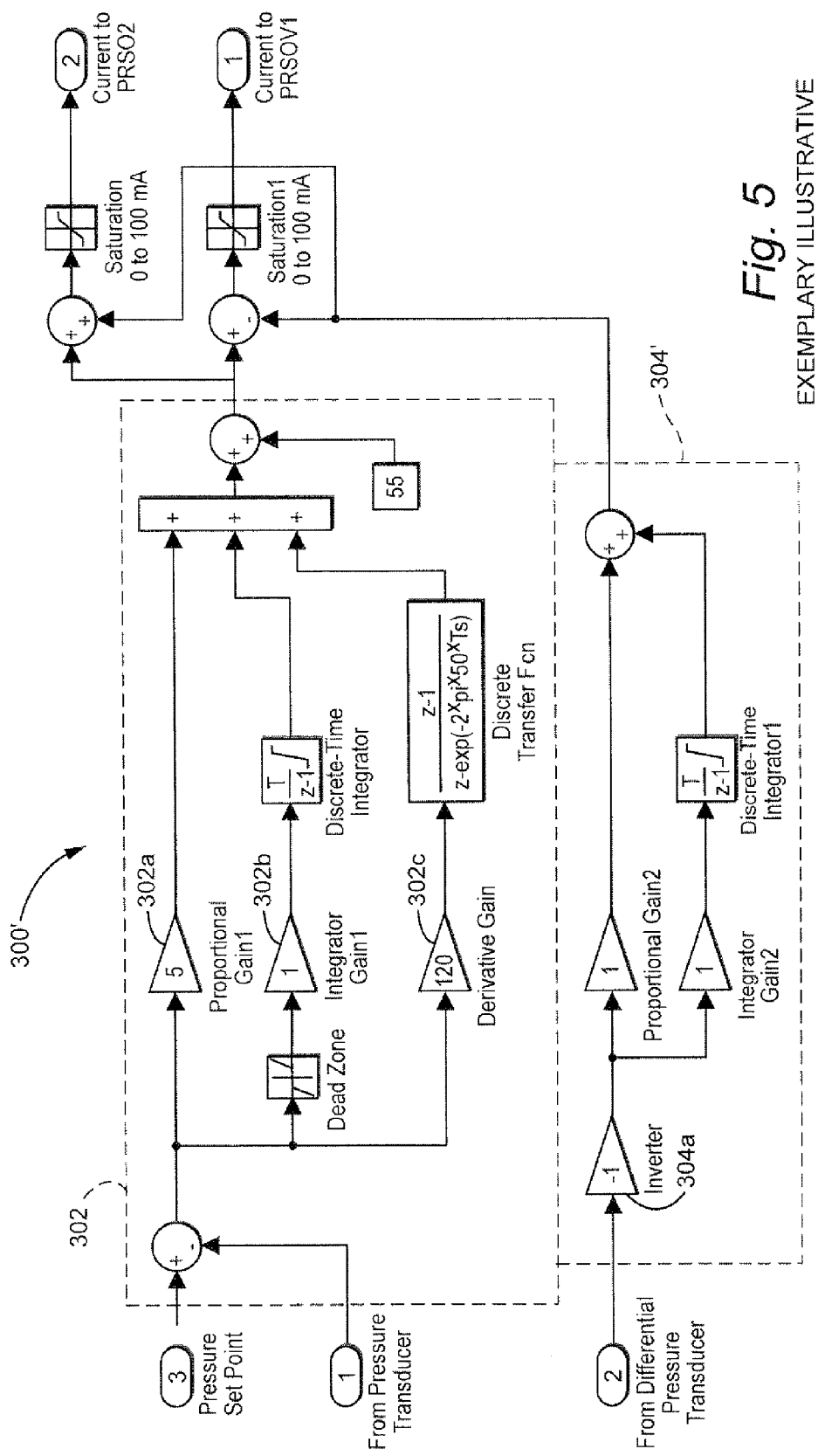
FIG. 5 shows exemplary illustrative non-limiting pressure shutoff valve control law architecture for a "venturiless" configuration.

In a further exemplary illustrative non-limiting implementation, if it is possible to obtain a significant pressure drop in the "T" duct of manifold 116, then both venturis 120*a*, 120*b* can be removed. In this case, the bi-directional differential pressure transducer 204 shall measure the differential pressure drop between the both sides of the "T" duct. Since the pressure drop increases when the flow increases (the pressure in the venturi throat has an inverted behavior), then the differential pressure signal provided by the differential transducer shall be inverted. An exemplary illustrative non-limiting modified control law architecture 300' shown in the FIG. 5 includes an additional inverter 304*a*.

While the technology herein has been described in connection with exemplary illustrative non-limiting embodiments, the invention is not to be limited by the disclosure. For example, the system can modified to provide bleed air flow balancing for a system providing more than two engines. The invention is intended to be defined by the claims and to cover all corresponding and equivalent arrangements whether or not specifically disclosed herein.

We claim:

1. A method of controlling bleed air flow of gas turbine engines comprising:
   (a) measuring the differential pressure between a first turbine engine bleed air flow and a second turbine engine bleed air flow;
   (b) generating a differential pressure correction signal in response to said measured differential pressure;
   (c) measuring the pressure of a bleed air flow obtained by combining said first and second bleed air flows; and
   (d) controlling valves modulating said first and second bleed air flows based on said measured pressure and said differential pressure correction signal.

2. The method of claim 1 further including measuring the temperature of said first bleed air flow and measuring the temperature of said second bleed air flow, and said controlling includes modulating said first and second bleed air flows in response to said measured temperatures.

3. The method of claim 1 wherein said differential pressure measuring comprises measuring the differential pressure between the throat of a first venturi through which said first bleed air flow, passes, and the throat of a second venturi through which said second bleed air flow passes.

4. The method of claim 1 wherein said differential pressure measuring comprises measuring the differential pressure between two different regions of a manifold used to combine said first and second bleed air flows.

5. The method of claim 1 further including deriving said first bleed air flow from a first gas turbine engine, and deriving said second bleed air flow from a second gas turbine engine.

6. The method of claim 1 wherein said generating includes applying a proportional gain, an integration and a differentiation.

7. The method of claim 1 wherein said controlling comprises controlling first and second pressure regulating shutoff valves.

8. A dual gas turbine engine bleed airflow regulator comprising:
   a single pressure transducer that measures the pressure of combined first bleed air flow from a first engine and a second bleed air flow from a second engine;
   a single differential pressure transducer that measures the difference between the pressure of said first bleed air flow and said second bleed air flow; and
   a controller responsive to said single differential pressure transducer and said single pressure transducer, said controller generating a first control signal for modulating said first bleed air flow and generating a second control signal for modulating said second bleed air flow.

* * * * *